(No Model.) 4 Sheets—Sheet 1.
T. STEWART.
FILTERING APPARATUS.

No. 424,375. Patented Mar. 25, 1890.

(No Model.) 4 Sheets—Sheet 2.

T. STEWART.
FILTERING APPARATUS.

No. 424,375. Patented Mar. 25, 1890.

(No Model.) 4 Sheets—Sheet 3.

T. STEWART.
FILTERING APPARATUS.

No. 424,375. Patented Mar. 25, 1890.

WITNESSES
F. L. Ourand
C. F. Chisholm

INVENTOR
Thomas Stewart
by Sous Prayer & Co.
Attorney

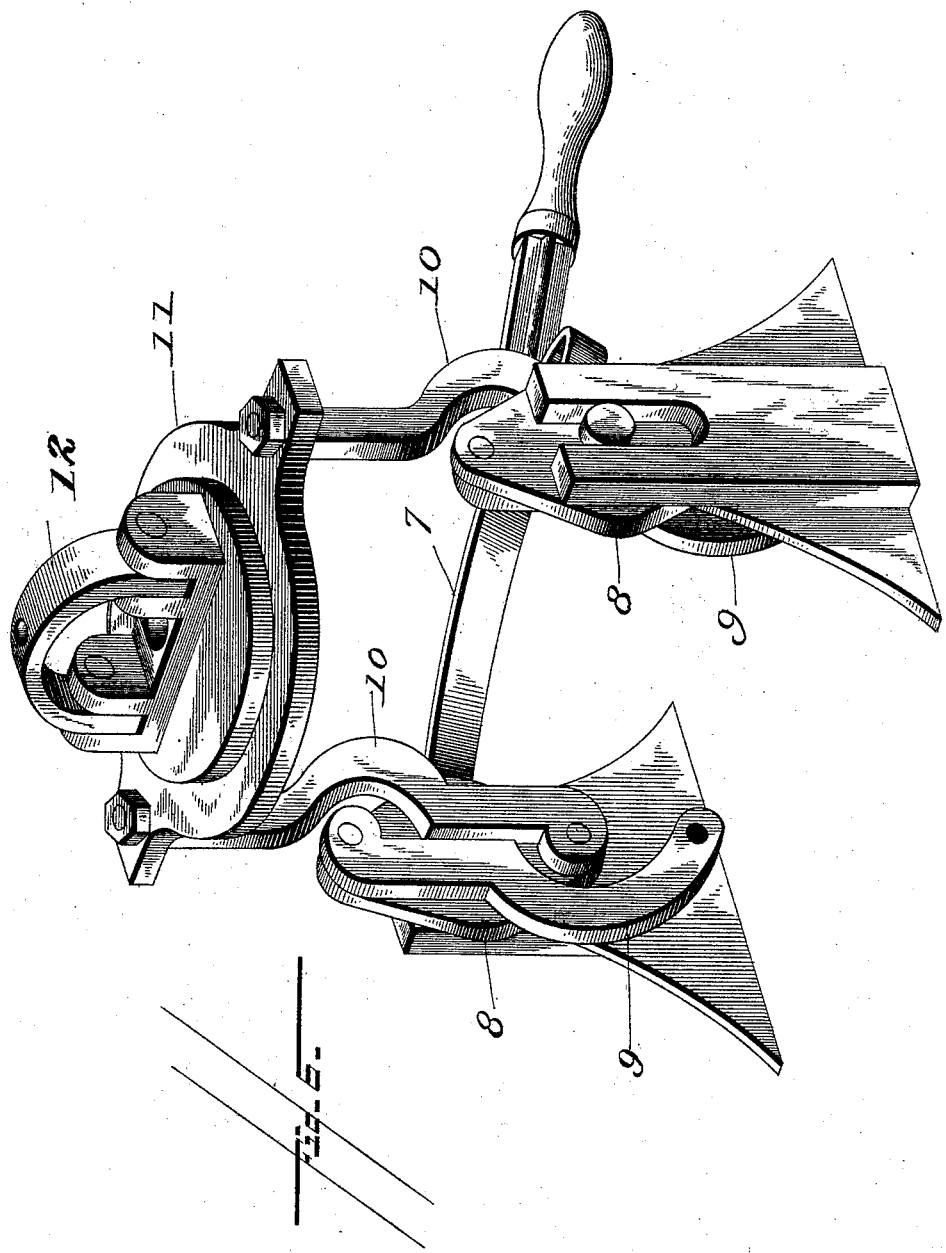

UNITED STATES PATENT OFFICE.

THOMAS STEWART, OF PHILADELPHIA, PENNSYLVANIA.

FILTERING APPARATUS.

SPECIFICATION forming part of Letters Patent No. 424,375, dated March 25, 1890.

Application filed May 18, 1889. Serial No. 311,245. (No model.)

*To all whom it may concern:*

Be it known that I, THOMAS STEWART, a citizen of the United States, and a resident of Philadelphia, in the county of Philadelphia and State of Pennsylvania, have invented certain new and useful Improvements in Filtering Apparatus; and I do hereby declare that the following is a full, clear, and exact description of the invention, which will enable others skilled in the art to which it appertains to make and use the same.

My invention relates to improvements in filtering apparatus, the leading object of the invention being the production of an inexpensive and durable apparatus which will perform the operation of filtering in a perfect and rapid manner.

To attain the desired object, the invention consists of a receiver having filtering devices therein and an air-pump communicating with the receiver and adapted to force the liquid through the filtering devices in the receiver and entirely remove the impurities from the liquid and in a rapid manner.

The invention also consists of the improved mechanism comprising the filtering apparatus substantially as illustrated, described, and specifically claimed.

Figure 1:
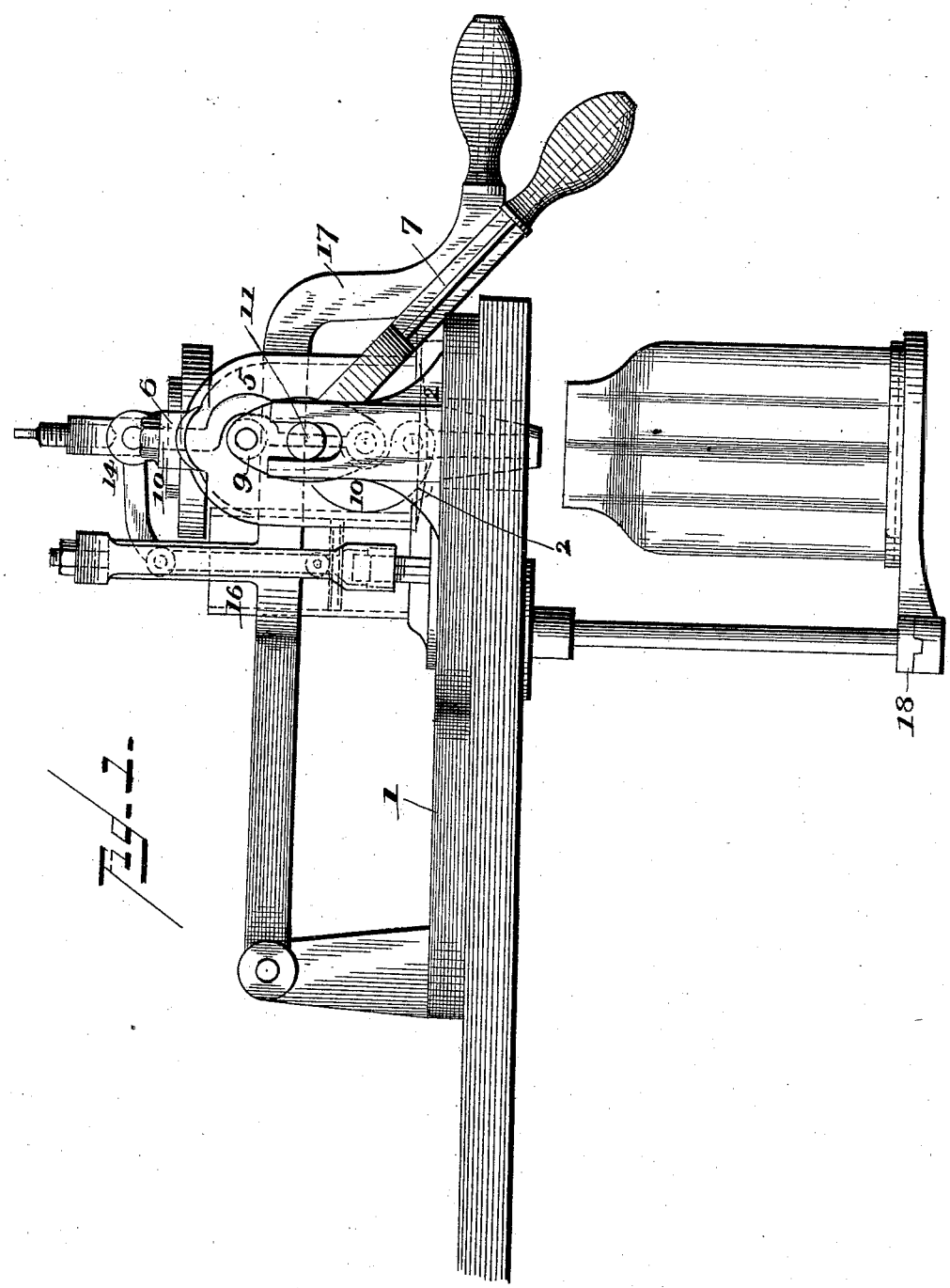
Figure 2:
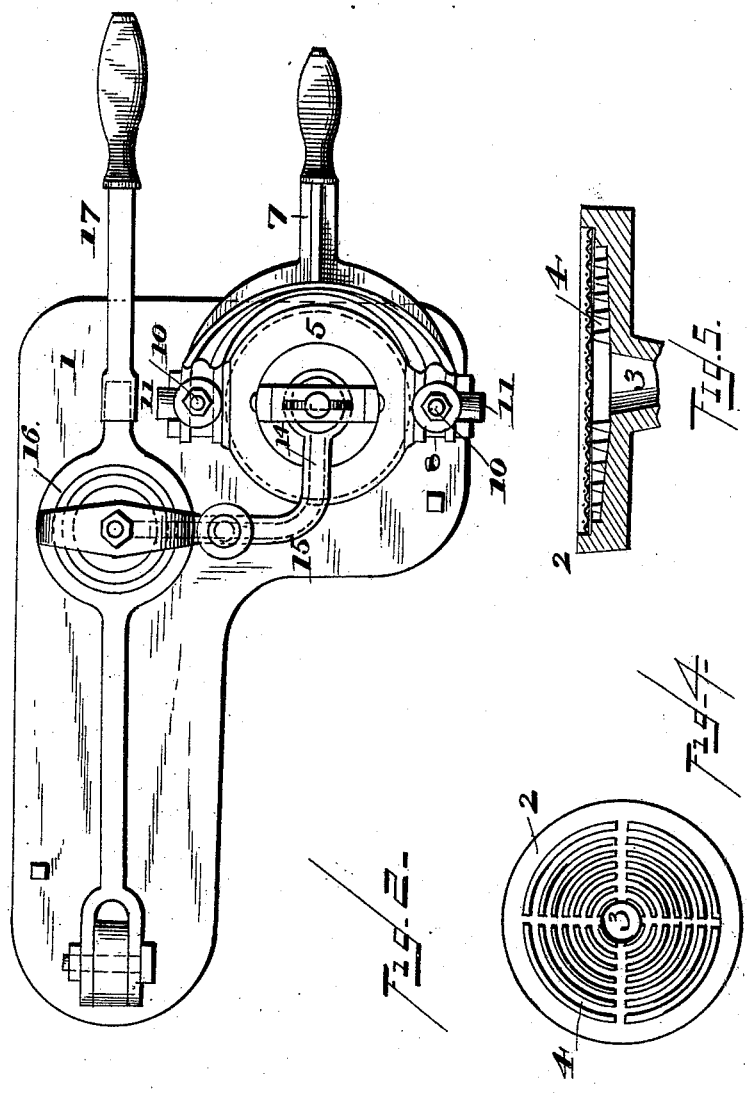
Figure 3:
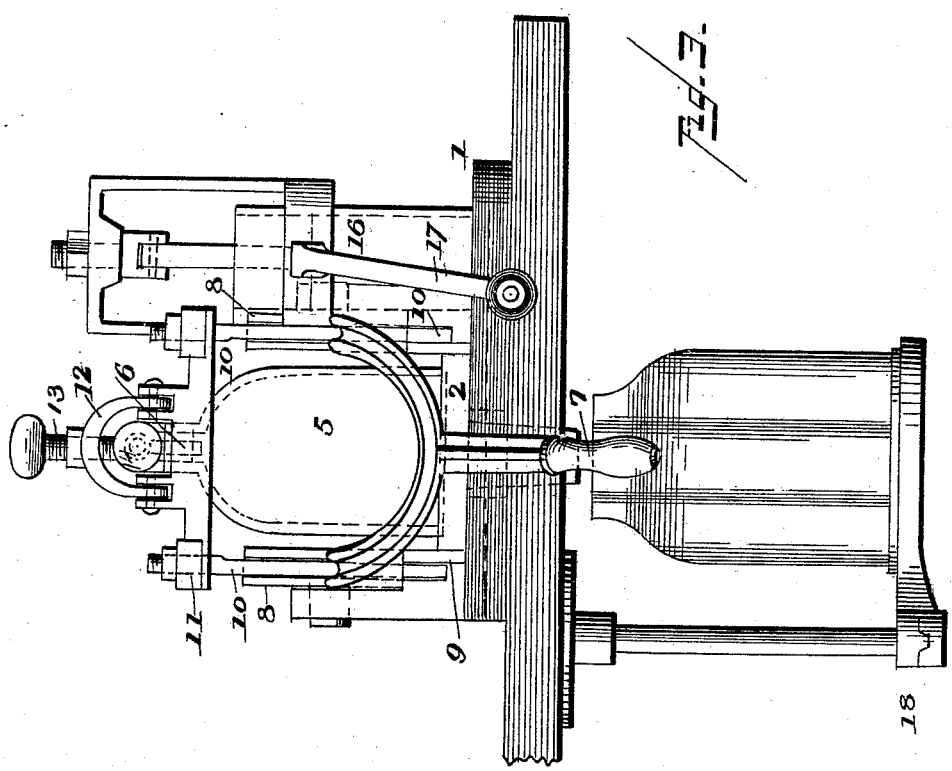

Figure 1 represents a side elevation of a filtering apparatus constructed in accordance with and embodying my invention. Fig. 2 represents a top plan view thereof. Fig. 3 represents a front end view thereof. Fig. 4 represents a plan view of the base of the filter; and Fig. 5 is a detail section of the base, showing the wire screen. Fig. 6 is a perspective view of the clamping device for the receiver.

Referring by numerals to the drawings, in which similar numerals of reference denote corresponding parts in the several figures, the numeral 1 designates the bed-plate or base of the machine, on which rests the plate or disk 2, having an opening or outlet 3 and gutters or channels 4 for conducting the liquid to the outlet 3 of said plate. On the plate 2 is placed a strainer 2ˣ, and on the plate 2 rests the receiver 5, having the opening or inlet 6 at the top thereof for supplying the liquid to be filtered.

To the base-plate 1 is fulcrumed the bifurcated or forked lever 7, which has the heads 8 at its ends, and to the upper and lower end of said heads are pivoted the links 9 and 10, the links 9 being pivoted at their lower ends to the base-plate, and the links 10 being pivoted at their upper ends to the transverse arm or cross-bar 11, the links 10 being screw-threaded at their ends and connected to the transverse arm 11 by nuts, whereby the arm may be adjusted on the links.

To the transverse arm 11 are pivoted the lower ends of a yoke or bail 12, which carries a clamping-screw 13, adapted to bear on the L-shaped pipe 14, which has one limb over and communicating with the inlet of the receiver.

From the construction described it will be seen that the receiver rests on a base provided with gutters or channels, and that the bifurcated lever and links may be operated to retain the receiver in place on the base, and also that the yoke carrying the clamping-screw serves to retain the L-shaped pipe in place on the receiver.

To the outer limb of the L-shaped pipe is connected a pipe or hose 15, leading to a pump 16, operated by a lever 17, for pumping air through the pipe 16 to the receiver to exert a pressure on the fluid therein.

Below the bed-plate 1, I place a suitable support or bracket 18, which sustains a receptacle for containing the filtered liquid.

The operation of my improved filtering apparatus will be readily understood from the foregoing description, taken in connection with the drawings, and may be briefly stated as follows: The straining or filtering cloth is placed on the wire strainer, the receiver is then clamped in place on the base-plate by the mechanism described, and charged with the fluid to be filtered. The pipe which communicates with the receiver and air-pump is held in position by the clamping-screw, and the lever or handle of the pump is then operated, forcing a volume of air into the receiver, and in consequence thereof impelling the liquid through the filtering cloth, paper, or screen on the base-plate, the gutters thereof guiding it to the outlet thereof, from whence it descends into the bottle, jar, or other receptacle supported on the bracket, the liquid being thus perfectly filtered and in a very short time.

It will be understood that when the forked or bifurcated lever is elevated the heads thereon are moved out of an upright position, thus distending the links; but when the lever is depressed the links are brought inward and serve to force the transverse arm or cross-bar on the receiver, and thus clamp the same in place, as will be readily understood.

I would have it understood that I do not confine myself to the use of air-pressure to force the fluid through the filter, as hydrostatic or other pressure may be employed with equal effectiveness.

Having thus described my invention, what I claim as new, and desire to secure by Letters Patent of the United States, is—

1. In a filter, the combination of the bed, the disk thereon having an outlet, a strainer on said disk, a receiver fitting on the disk, a bifurcated lever pivoted to the base and having heads, lower and upper links pivoted to the heads and bed, a cross-bar connected to the upper links, a clamp carried by the cross-bar, and a pipe leading from a pump and communicating with the receiver and clamped in place by the clamps on the cross-bar, substantially as described.

2. In a filter, the combination of a bed, a support depending from the same, a disk having an outlet arranged on the bed, a strainer on said disk, a receiver fitting on the disk, a pipe leading from a pump communicating with the receiver, and clamps for securing the pipe and receiver in place, substantially as described.

3. In a filter, the combination, with the bed and the receiver, of the lever pivoted to the bed, the link connected to said lever, and the cross-bar or arm connected to the links, all arranged and operating substantially as and for the purpose described.

4. In a filtering apparatus, the combination of the bed, the bifurcated lever fulcrumed thereto, the upper and lower links connected to said lever, the arms connected to the upper links, the yoke carrying a clamping-screw pivoted to the arms, the receiver, the filter therein, the pipe communicating with the receiver, and the air-pump communicating with the pipe for supplying air to the receiver, said elements being arranged and adapted to operate substantially as and for the purpose described.

5. In a filter, the combination of the bed, the receiver thereon, the lever pivoted to the bed, the lower links connected to the lever and bed, the upper links connected to the lever and cross-bar, the cross-bar adjustably connected to said upper link, the clamp on the cross-bar, the pipe leading to the receiver and secured by said clamp, and the pump communicating with said pipe, substantially as described.

In testimony that I claim the foregoing as my own I have hereunto affixed my signature in presence of two witnesses.

THOMAS STEWART.

Witnesses:
R. M. GREINER,
ROBERT TOWN, Jr.